United States Patent
Kim

(10) Patent No.: US 11,098,785 B2
(45) Date of Patent: Aug. 24, 2021

(54) MOUNT FOR VEHICLE

(71) Applicants: HYUNDAI MOTOR COMPANY, Seoul (KR); KIA MOTORS CORPORATION, Seoul (KR)

(72) Inventor: Seung Won Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 166 days.

(21) Appl. No.: 16/454,953

(22) Filed: Jun. 27, 2019

(65) Prior Publication Data
US 2020/0292026 A1    Sep. 17, 2020

(30) Foreign Application Priority Data
Mar. 11, 2019    (KR) .......................... 10-2019-0027468

(51) Int. Cl.
*F16F 13/08*    (2006.01)
*B60K 5/12*    (2006.01)

(52) U.S. Cl.
CPC ............ *F16F 13/08* (2013.01); *B60K 5/1208* (2013.01); *F16F 2224/02* (2013.01); *F16F 2230/0005* (2013.01); *F16F 2230/0023* (2013.01)

(58) Field of Classification Search
CPC .......... F16F 13/08; F16F 13/085; F16F 13/10; F16F 13/16; F16F 13/101; F16F 13/103; F16F 13/107; F16F 2230/0023; F16F 2230/0005; F16F 2224/02; B60K 5/1208
See application file for complete search history.

(56) References Cited

U.S. PATENT DOCUMENTS

| 10,808,793 | B2* | 10/2020 | Kim ................... F16F 13/1463 |
| 2009/0321202 | A1* | 12/2009 | Hamada ............. F16F 13/1463 |
| | | | 188/322.5 |
| 2013/0264756 | A1* | 10/2013 | Daito ..................... F16F 13/08 |
| | | | 267/140.13 |
| 2015/0069685 | A1* | 3/2015 | Kim ........................ F16F 13/08 |
| | | | 267/140.13 |

FOREIGN PATENT DOCUMENTS

| JP | 2009-299782 A | 12/2009 |
| JP | 4823976 B2 | 11/2011 |
| JP | 2013-204801 A | 10/2013 |
| KR | 10-1324533 B1 | 11/2013 |

OTHER PUBLICATIONS

Translation of KR 101324533 document obtained from website: https://worldwide.espacenet.com on Feb. 3, 2021.*

* cited by examiner

*Primary Examiner* — Pamela Rodriguez
(74) *Attorney, Agent, or Firm* — Morgan, Lewis & Bockius LLP

(57) ABSTRACT

A mount for supporting a power train in the vehicle, may include a stopper assembly combined on an internal surface of a housing to be disposed in an annular shape along the vicinity of the outsides of insulators combined with the housing, wherein the stopper assembly may include: an external ring combined on the internal surface of the housing; and a plurality of stopper members fixed on an internal surface of the external ring to be positioned along the vicinity of the outsides of the insulators, each of the a plurality of stopper members being spaced from each other to be in contact with an internal insulator of the insulators.

8 Claims, 12 Drawing Sheets

MOUNT FOR VEHICLE

CROSS REFERENCE TO RELATED APPLICATION

The present application claims priority to Korean Patent Application No. 10-2019-0027468, filed Mar. 11, 2019, the entire contents of which is incorporated herein for all purposes by this reference.

BACKGROUND OF THE INVENTION

Field of the Invention

The present invention relates to a mount for a vehicle. More particularly, the present invention relates to a mount for a vehicle, wherein a stopper is tuned and optimized more easily and variously without modifying or newly manufacturing a mold for forming an insulator.

Description of Related Art

Recently, in the vehicle industry, due to the demand of fuel efficiency improvement in the present era of environmental control and high-priced oil, vehicle development is being made focusing on high-output of an engine and weight reduction of a vehicle.

However, since noise and vibration of an engine are increased as the vehicle body has become light due to the trend, great noise and vibration are caused in a vehicle even by a slight oscillation.

Furthermore, as a technology applied to a vehicle has developed gradually and consumer demands of low noise and low vibration have increased, efforts to maximize riding comfort by analyzing noise, vibration, and impact of a vehicle are continuously being made.

During vehicle driving, engine vibration of a specific frequency occurring in a specific RPM range is transmitted through a vehicle body to an internal of a vehicle, and in the instant case, the engine vibration has a considerable impact on the internal of a vehicle.

In terms of the structure of an engine, vibration continuously occurs in the engine due to periodical changes of center positions of a piston and a connecting rod caused by upward and downward movements thereof, an inertial force caused by a reciprocating motion of a piston operating in a direction of a cylinder shaft, an inertial force caused by shaking of the connecting rod to the left and right of a crankshaft, and a periodical change of a rotational force applied to the crankshaft.

Accordingly, an engine of a vehicle and the vehicle body include an engine mount provided therebetween, the engine mount supporting the engine and reducing noise and vibration transmitted from the engine.

The engine mount supports a power train and insulates the vehicle body from being affected by a vibratory force transmitted from an engine to reduce noise and vibration, improving riding comfort.

The engine mount is largely divided into a rubber engine mount, an air-damping engine mount, and a hydraulic engine mount.

At an initial stage, the rubber engine mount, that is, a simple rubber mount was mostly used, but the hydraulic engine mount has been developed and used to improve a damping characteristic.

The rubber engine mount using a rubber material is very vulnerable to a low frequency vibration (a large displacement vibration), and cannot achieve sufficient clamping performance for a high frequency vibration (a low amplitude vibration) and the low frequency vibration (the large displacement vibration).

Accordingly, a hydraulic engine mount is widely used since the hydraulic engine mount can absorb and reduce a wide range of vibrations including the high frequency vibration (the low amplitude vibration) and the low frequency vibration (the large displacement vibration) input to the engine mount according to engine operation.

The hydraulic engine mount is also referred to as "a fluid mount" or "a hydro mount", has a structure in which a damping force occurs as fluid sealed under an insulator moves through a flow path between an upper fluid chamber and a lower fluid chamber, and may reduce the high frequency vibration (a small displacement vibration) and the low frequency vibration (the large displacement vibration) depending on situations.

FIG. 1 is a cross-sectional view exemplarily illustrating a conventional mount for a vehicle, and FIG. 2 is a perspective view exemplarily illustrating the conventional insulator integral to a stopper of forward/rearward and leftward/rightward directions.

The mount 10, which is shown, may be the hydraulic engine mount supporting an engine as an example of components of the power train of a vehicle, and may include a center bolt 11 engaged with an engine, an internal core 12 with which the center bolt 11 is combined, and the insulator 13, of a rubber material formed to be integrally combined with the internal core 12.

In the configuration, the insulator 13 fixes and supports the internal core 12, and defines an upper fluid chamber C1 in cooperation with an orifice assembly 14 provided at a lower side of the insulator.

A pipe 13a is combined on a lower portion of the insulator 13, and after the internal core 12 provided with the center bolt 11 is manufactured, the internal core 12 and the pipe 13a are mounted in the mold, and then the insulator 13 of a rubber material combined integrally with the internal core 12 and the pipe 13a may be formed through a vulcanizing process in the mold.

The orifice assembly 14 may include an orifice plate 15 and may further include a membrane 16.

The orifice plate 15 is transversely provided to divide a mount internal fluid chamber into the upper fluid chamber C1 and a lower fluid chamber C2 at a lower side of the insulator 13 in the mount 10.

The orifice plate 15 may include an upper plate 15a and a lower plate 15b.

Furthermore, the orifice plate 15 has an orifice 15c forming a circular bypass flow path (also referred to as an inertia track) to induce fluid movement between the upper fluid chamber C1 and the lower fluid chamber C2.

A diaphragm 17 is provided at a lower side of the orifice plate 15, and the orifice plate 15 and the diaphragm 17 define the lower fluid chamber C2.

The orifice plate 15 may include a hole communicating the orifice 15c with the upper fluid chamber C1 and a hole communicating the orifice 15c with the lower fluid chamber C2.

Accordingly, the upper fluid chamber C1, the orifice 15c, and the lower fluid chamber C2 are configured to communicate with one another such that fluid moves therebetween through the holes of the orifice plate 15.

Meanwhile, as shown in FIG. 2, the insulator 13, having three-direction characteristics, of the mount 10 for a vehicle is configured to be integrally provided with the stopper 13b of forward/rearward and leftward/rightward directions, and according to required characteristics of the mount, the shape of the stopper 13b is required to be variously tuned for a secondary characteristic in the insulator 13.

FIG. 2 illustrates two kinds of insulators 13 integral to the stoppers, each of which has a different-shaped stopper 13b, and a left-side insulator and a right-side insulator are insulators integral to the stoppers.

As shown in FIG. 2, the shape of the stopper 13b is tuned to be optimized in keeping with a required mount characteristic, and the shape of the stopper 13b may be variously modified when necessary.

However, since the stopper 13b is integrally provided with the insulator 13, a mold for forming the insulator is required to be modified whenever the shape of the stopper is tuned, and accordingly, the degree of tuning freedom is reduced by the modification of the stopper, which has many restrictions.

During modification of an insulator mold, many changes to different characteristics and much modification cannot be made, and accordingly, generally, optimization of the stopper is not performed.

Recently, a vehicle trend is a focus on drivability. In the past, many efforts were focused on vibration minimization during idling of a vehicle in favor of a quiet car, while recently, as a power engine is mounted on a vehicle, many efforts are focused to have the feeling of smooth driving by minimizing vibration shock and a jerk during starting of a vehicle.

To improve drivability, it is necessary that the power train, i.e., an engine and a transmission, which contributes to vehicle vibration the most during starting and stopping a vehicle, may be designed to be integrally provided with the vehicle body.

To the present end, although much attention is directed to torque logic tuning of an engine, fuel efficiency deteriorates when logic is tuned to decrease vibration shock and jerk. Accordingly, recently, much research is being conducted on characteristics of forward and backward directions of the engine mount, rather than on the logic.

However, since many power trains are mounted on one vehicle, the shape of the stopper is also required to be different for every power train. This is because inertial specification and a rotation shaft are different for every power train.

Accordingly, when the power trains have different stoppers, as the number of required specifications of the stoppers increases, the number of the insulator molds also increases, which increases cost.

Furthermore, since the shape of the stopper is required to be optimized while the insulator mold is modified, development period and expenses increase.

Furthermore, the stopper cannot be applied to the conventional upside down mount.

FIG. 3 is a cross-sectional view exemplarily illustrating a portion of configuration of a housing 18 and the insulator 13 in the conventional upside down mount, and as for the upside down mount, the mount is provided upside down, wherein a rubber system including the insulator 13 is positioned at a lower side of the mount and a fluid system including the orifice assembly and the diaphragm is positioned at an upper side of the mount.

In the upside down mount, the insulator 13 is vulcanizingly formed to be integral to the housing 18, and when the insulator 13 is formed to be integral to the housing 18, due to the structure of removing the insulator mold, forming the stopper of forward and rearward directions to be integral to the insulator is impossible.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a mount for a vehicle, wherein the shape of a stopper is tuned and optimized more easily and variously without modifying or newly manufacturing a mold for forming an insulator.

The present invention is also intended to propose an upside down mount to which a stopper is applied. To achieve the above-mentioned object, according to the exemplary embodiment of the present invention, there is provided a mount for supporting a power train in the vehicle, the mount including: a stopper assembly combined on an internal surface of a housing to be disposed in an annular shape along the vicinity of the outsides of insulators combined with the housing, wherein the stopper assembly may include: an external ring of an annular shape combined on the internal surface of the housing; and stopper members fixed on an internal surface of the external ring to be positioned along the vicinity of the outsides of the insulators, each of the stopper members being spaced from each other to be in contact with an internal insulator of the insulators.

Accordingly, the mount for a vehicle according to an exemplary embodiment of the present invention has a structure in which a stopper of forward/rearward and leftward/rightward directions is independently manufactured and assembled, whereby the shape of the stopper is easily and freely tuned and optimized without modifying an insulator mold.

Furthermore, in the mount for a vehicle according to an exemplary embodiment of the present invention, the degree of tuning freedom of the stopper increases, and other various problems of the conventional insulator integral to the stopper, such as increased cost, an increased development period, and increased expenses due to mold modification and the increase of the number of the mold, are removed.

That is, in the mount for a vehicle according to an exemplary embodiment of the present invention, the insulator and the stopper, which are manufactured independently, are combined with each other, whereby optimization is achieved to improve an optimization rate and performance of the mount, and to reduce the period and expenses required for development.

Furthermore, according to configuration of the present invention, an upside down mount to which the stopper is applied is easily manufactured.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
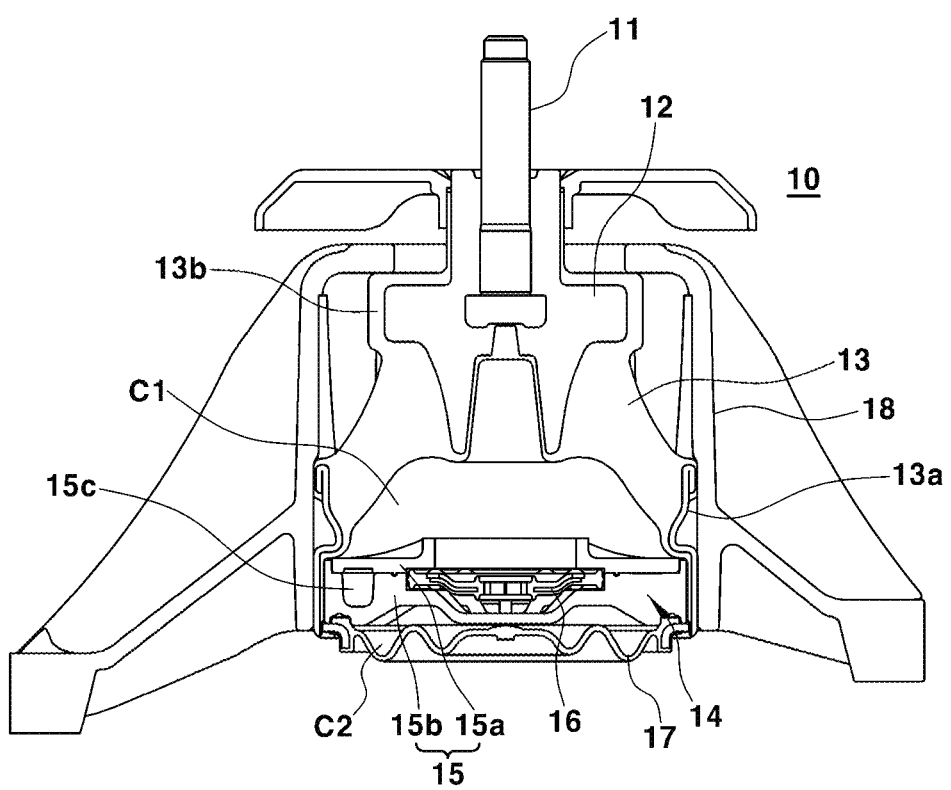
FIG. 1 is a cross-sectional view exemplarily illustrating a conventional mount for a vehicle.
Figure 2:
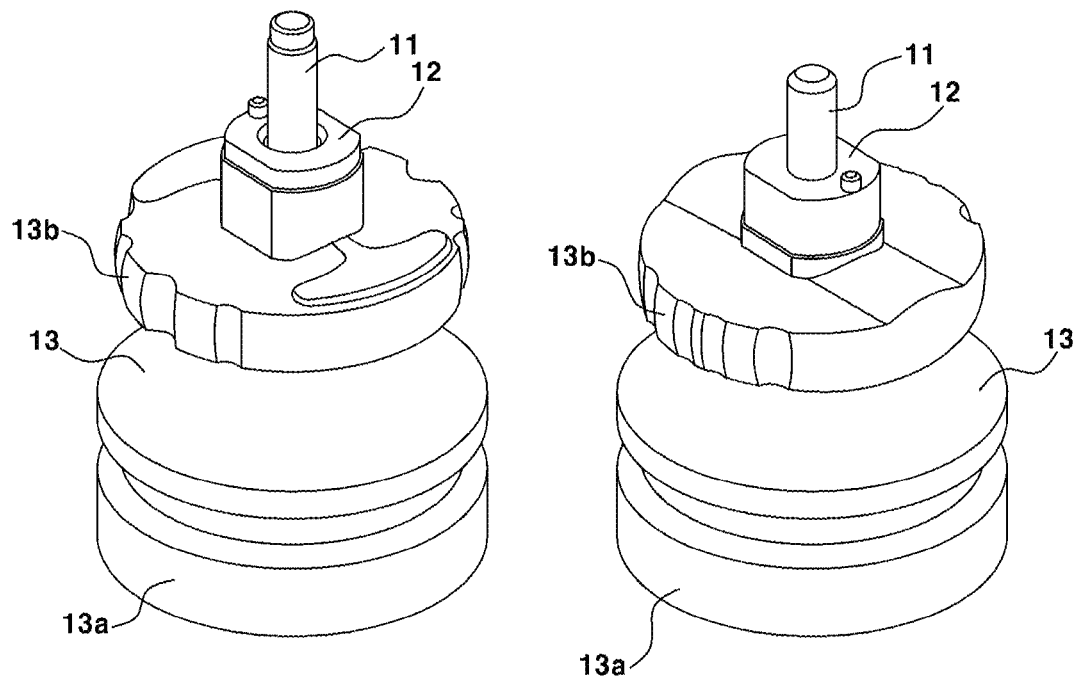
FIG. 2 is a perspective view exemplarily illustrating a conventional insulator integral to a stopper.
Figure 3:
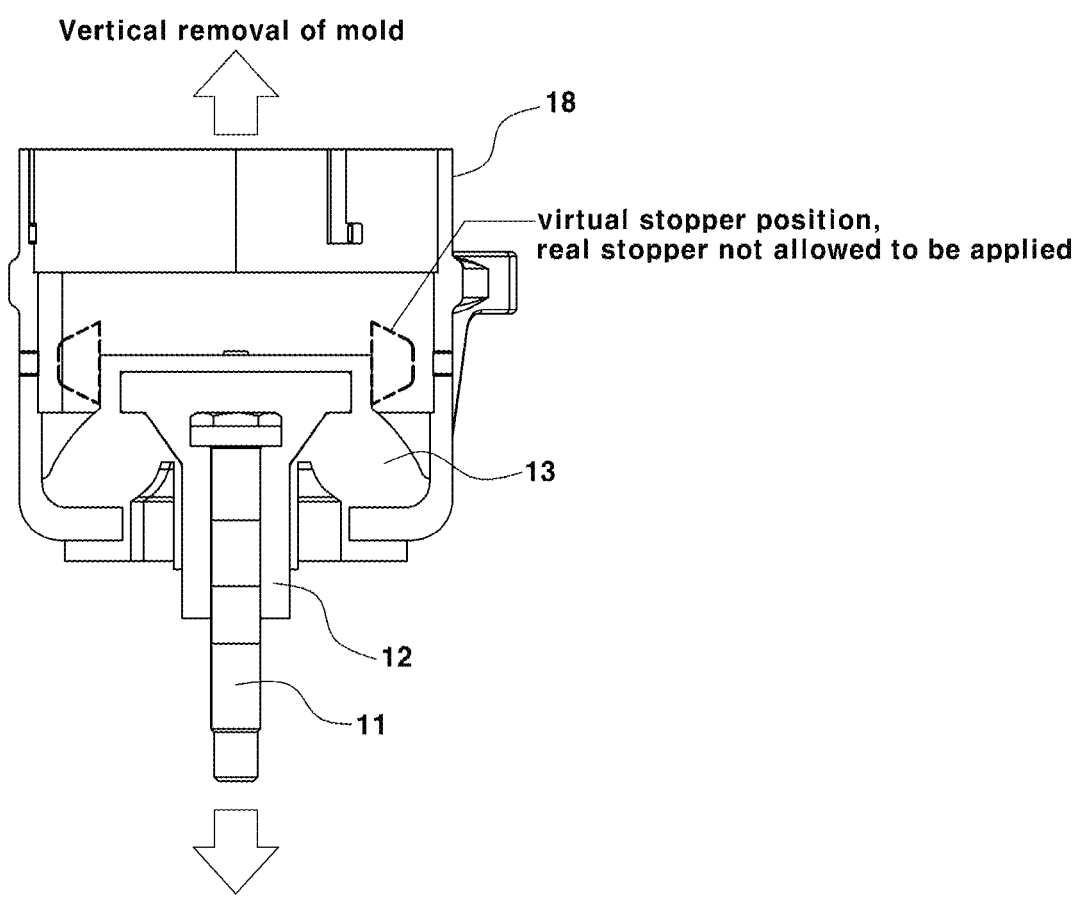
FIG. 3 is a cross-sectional view exemplarily illustrating a portion of configuration of a housing and the insulator in the conventional upside down mount.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinbelow, reference will now be made in greater detail to an exemplary embodiment of the present invention, an example of which is illustrated in the accompanying drawings such that those skilled in the art can efficiently perform the exemplary embodiment of the present invention. However, the present invention is not limited to the exemplary embodiment thereof and may be variously realized.

The statement that a part "includes" an element throughout the specification specifies that the part may further include, unless otherwise stated, other elements, and not exclude other elements.

The present invention is directed to providing a mount for a vehicle, wherein the shape of a stopper is tuned and optimized more easily and variously for a secondary characteristic without modifying or newly manufacturing a mold for forming insulators.

Furthermore, the present invention is directed to providing the mount for a vehicle, wherein degree of tuning freedom of the stopper is increased, the expense and cost of the mold are reduced, and the period and expenses required for development are decreased.

To the present end, in the mount for a vehicle according to an exemplary embodiment of the present invention, the stopper is independently manufactured in a shape tuned and optimized to meet required characteristics of the stopper and is assembled with a housing.

The mount of the present invention as a mount for the power train may be embodied as an engine mount or as an upside down mount to which the stopper is applied.

Figure 4:
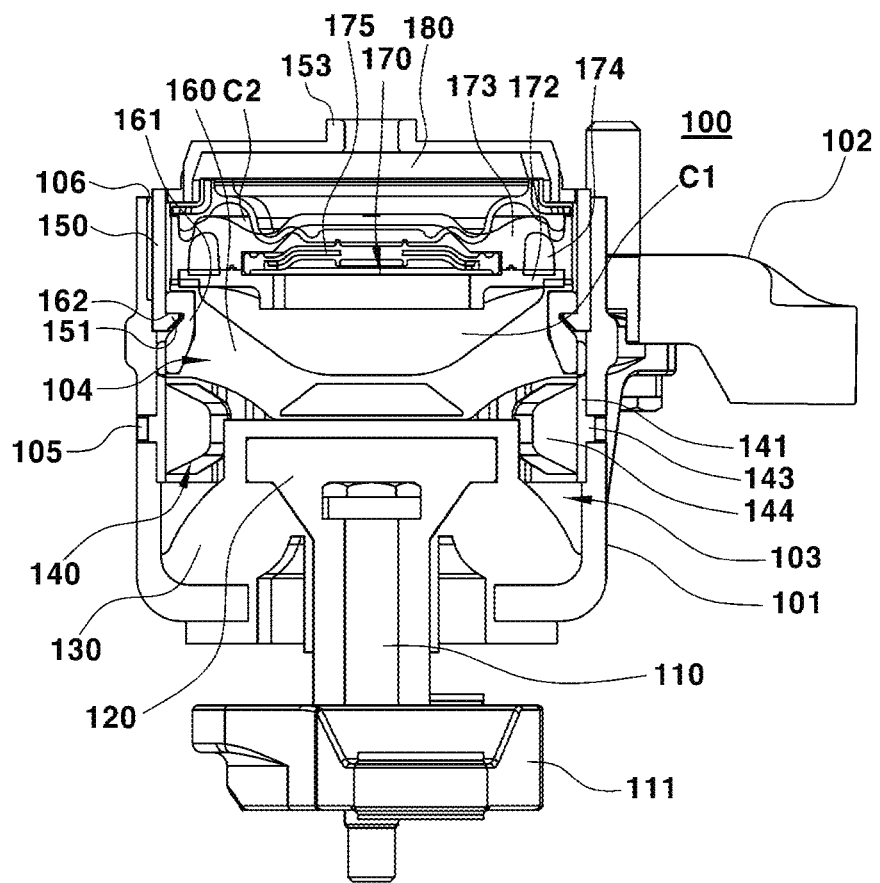
FIG. 4 is a cross-sectional view exemplarily illustrating a mount according to the exemplary embodiment of the present invention.
Figure 5:
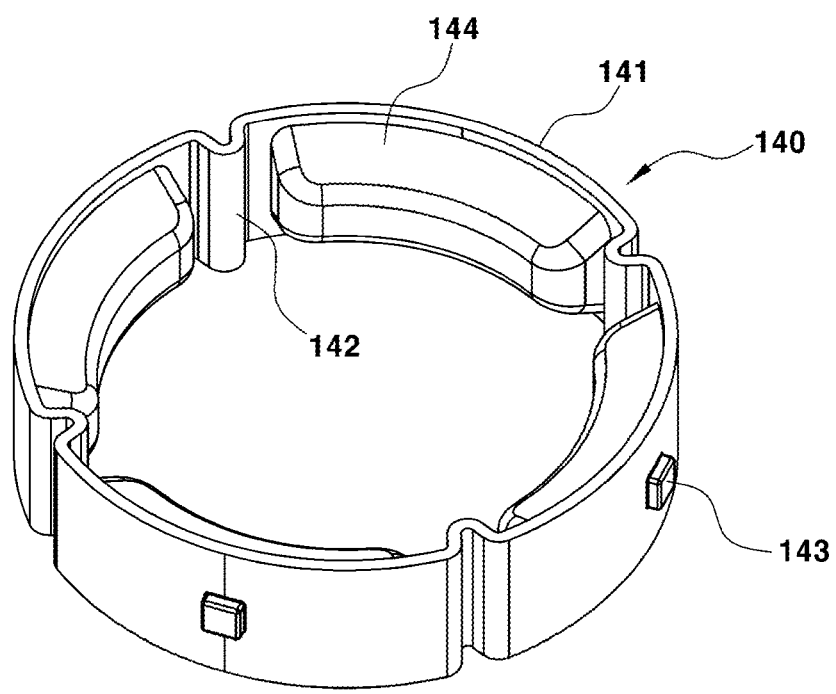
FIG. 5 is a perspective view exemplarily illustrating a stopper assembly of the mount according to the exemplary embodiment of the present invention.
Figure 6:
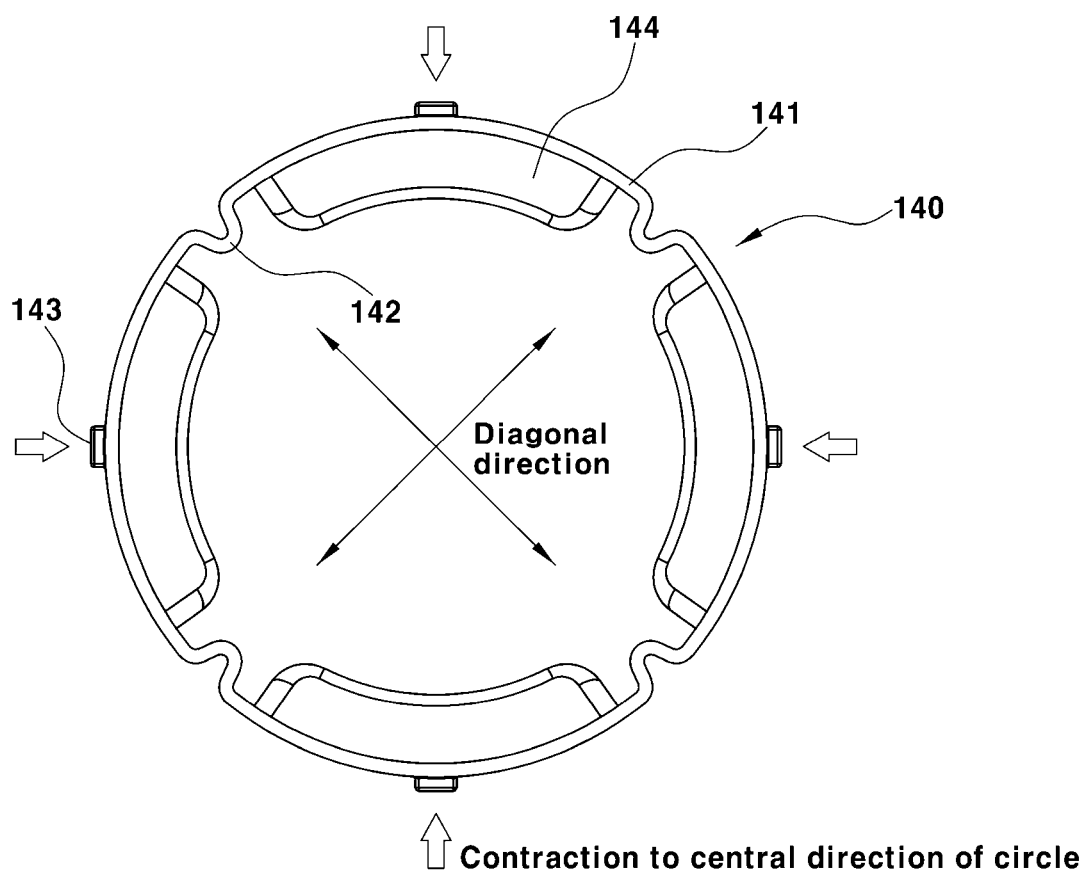
FIG. 6 is a top plan view exemplarily illustrating the stopper assembly of the mount according to the exemplary embodiment of the present invention.

FIG. 4 is a cross-sectional view exemplarily illustrating a mount according to the exemplary embodiment of the present invention; FIG. 5 is a perspective view exemplarily illustrating a stopper assembly of the mount according to the exemplary embodiment of the present invention; and FIG. 6 is a top plan view exemplarily illustrating the stopper assembly of the mount according to the exemplary embodiment of the present invention.

Figure 7:
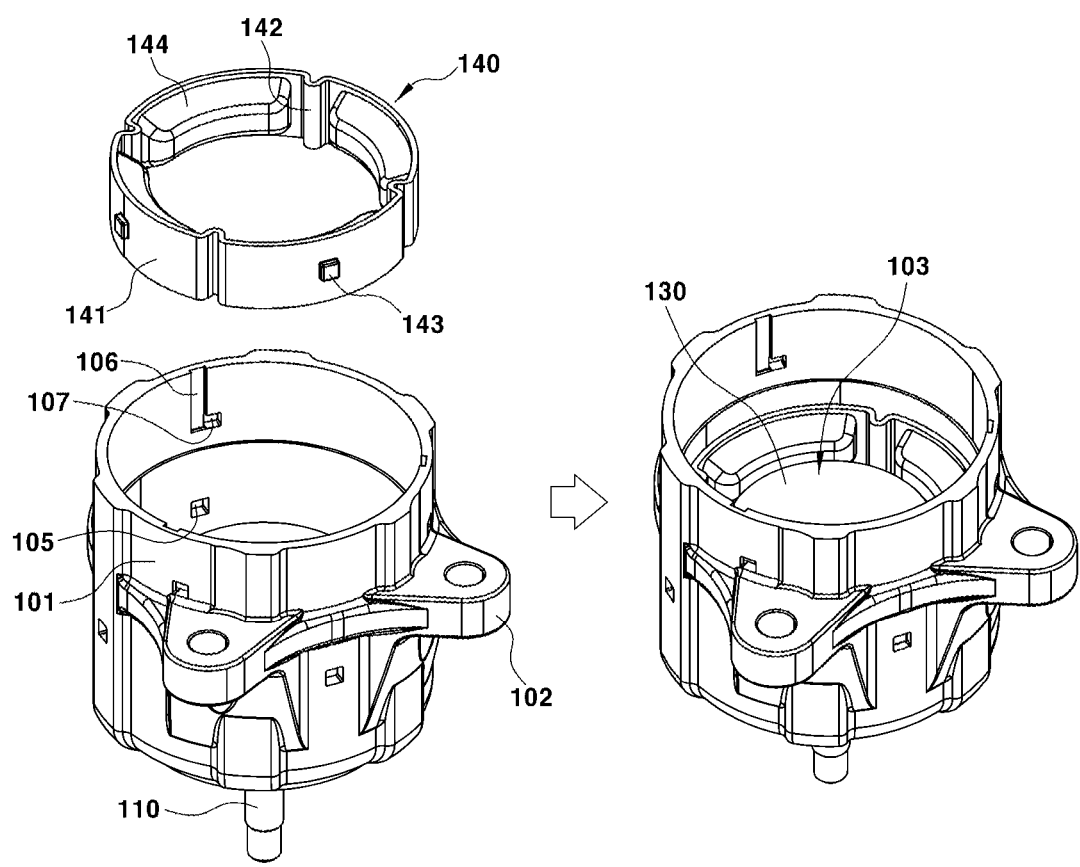
FIG. 7 is a perspective view exemplarily illustrating a process in which the stopper assembly is assembled with the housing in the mount according to the exemplary embodiment of the present invention.
Figure 8:
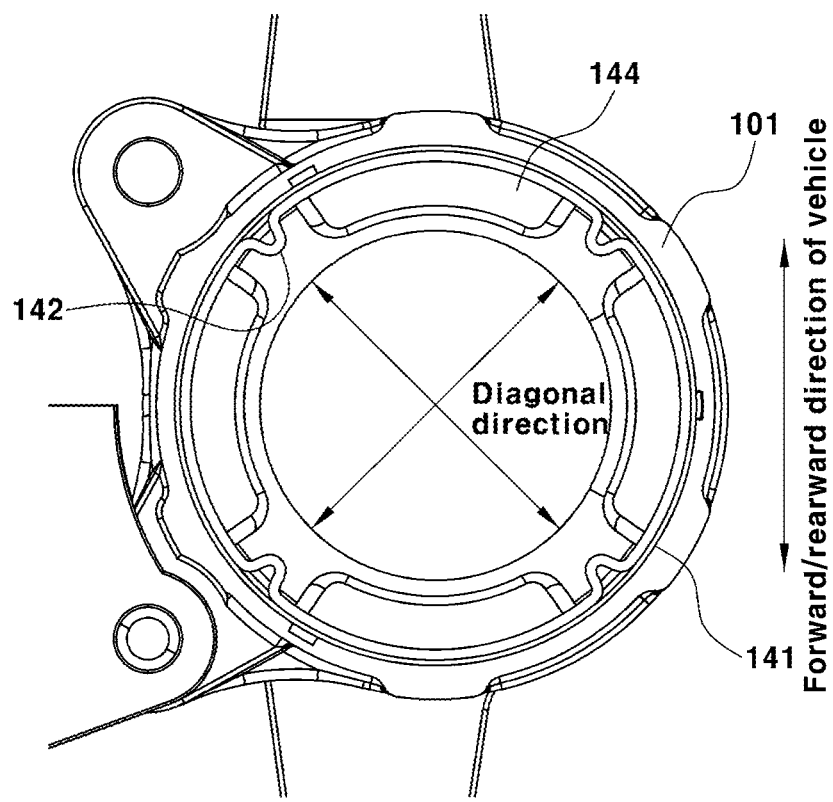
FIG. 8 is a top plan view of a state of the stopper assembly assembled with the housing in the mount according to the exemplary embodiment of the present invention.

FIG. 7 is a perspective view exemplarily illustrating a process in which the stopper assembly is assembled with the housing in the mount according to the exemplary embodiment of the present invention, and FIG. 8 is a top plan view of a state of the stopper assembly assembled with the housing in the mount according to the exemplary embodiment of the present invention.

The mount 100 of the shown embodiment as a fluid-sealed upside down mount is a tunable upside down engine mount configured such that a rubber system 103 having an insulator 130 and a fluid-sealed fluid system 104 are separated from each other.

The rubber system 103 and the fluid system 104 are assembled with each other to form the integral type mount 100.

The present invention will be described in detail by referring to the drawings. As shown in FIG. 4, the upside down mount 100 according to the exemplary embodiment of the present invention includes the rubber system 103 including the insulator 130 positioned on a lower side of the mount, and the fluid-sealed fluid system 104 positioned on an upper side of the mount, the fluid system including an orifice assembly 170 and a diaphragm 180.

Furthermore, in the upside down mount 100, a support bracket 102 provided integrally with the housing 101 is mounted to an engine as an example of the power train, which is not shown, and an additional lower support bracket 111 is mounted to the vehicle body, which is not shown, while the under support bracket is combined with a center bolt 110.

The support bracket 102 mounted to the side of the engine is provided integrally with the housing 101.

In the upside down mount 100, the rubber system 103 may include the center bolt 110 mounted to the side of the vehicle body, an internal core 120 with which the center bolt 110 is combined, and the first insulator 130 formed to be integrally combined with the internal core 120.

In the rubber system 103, the first insulator 130 supports the internal core 120 and the center bolt 110 while the first insulator is integrally combined with the housing 101.

The first insulator 130 is vulcanizingly formed to be integrally combined with an internal surface of the housing 101 such that the first insulator 130 surrounds the internal core 120 in the mold after the housing 101 and the internal core 120 is disposed in the mold.

Furthermore, the stopper assembly 140 is combined on the internal surface of the housing 101 to be disposed at an outside of the first insulator 130 along the vicinity of the first insulator, wherein the stopper assembly 140 combined on the internal surface of the housing 101 is spaced from the internal first insulator 130 of the insulators.

The stopper assembly 140 is disposed to have an annular shape along the vicinity of the first insulator 130 while being combined on the internal surface of the housing 101, and as shown in FIGS. 5, 6, and 8, the stopper assembly may be disposed to have a circular annular shape along the vicinity of the first insulator 130.

Furthermore, the fluid system 104 provided above the stopper assembly 140 is inserted into an upper portion of the housing 101 to be combined thereon.

The fluid system 104 includes a cupped hook 150, the orifice assembly 170 assembled in the cupped hook 150, the diaphragm 180, and a second insulator 160 hooked to the cupped hook 150 by hooking.

The cupped hook 150 may be manufactured of synthetic resin, and includes a plurality of hooks 151 mounted on a lower end portion thereof, the hooks being disposed at predetermined intervals along a circumferential direction of the cupped hook.

In the fluid system 104, the second insulator 160 is positioned on an upper side of the first insulator 130 to be supported by the first insulator 130 of the rubber system 103.

In the fluid system 104, while the orifice assembly 170 and the diaphragm 180 is inserted into the cupped hook 150, each of the hooks 151 of the cupped hook 150 is hooked to and combined with a holding jaw 162 of a core pipe 161 of an annular shape combined integrally on an external surface of the second insulator 160, whereby the cupped hook 150, the second insulator 160, the orifice assembly 170, and the diaphragm 180, which form the fluid system 104, are integrated with each other.

In the fluid system 104, the second insulator 160 defines the upper fluid chamber C1 in cooperation with the orifice assembly 170 of an upper side of the second insulator.

In the fluid system 104, the orifice assembly 170 includes an orifice plate 171 and a membrane 175, wherein the orifice plate 171 is transversely provided to divide an internal fluid chamber of the fluid-sealed fluid system into the upper fluid chamber C1 and the lower fluid chamber C2 between the second insulator 160 and the diaphragm 180.

The orifice plate 171 may include an upper plate 172 and a lower plate 173.

The orifice plate 171 has an orifice 174 defining a circular bypass flow path (also referred to as an inertia track) to induce fluid movement between the upper fluid chamber C1 and the lower fluid chamber C2.

The diaphragm 180 is provided at an upper side of the orifice plate 171, and accordingly, the orifice plate 171 and the diaphragm 180 define the lower fluid chamber C2.

The orifice plate 171 includes a hole communicating the orifice 174 with the upper fluid chamber C1 and a hole communicating the orifice 174 with the lower fluid chamber C2.

Accordingly, the upper fluid chamber C1, the orifice 174, and the lower fluid chamber C2 are communicating with each other such that fluid moves between the upper fluid chamber C1, the orifice 174, and the lower fluid chamber C2 through the holes of the orifice plate 171.

In the mount of the present invention 100, the stopper assembly 140, which is independently manufactured and configured, may be tuned according to a required characteristic of the mount, and as shown in FIG. 5 and FIG. 6, the stopper assembly 140 includes an external ring 141 combined with the housing 101 to be in close contact with the internal surface of the housing 101, and stopper members 144 fixed to an internal surface of the external ring.

The external ring 141 may have an annular shape, and be manufactured of synthetic resin.

Furthermore, the external ring 141 includes bending portions 142 provided thereon, the bending portions being disposed at predetermined intervals along a circumferential direction of the external ring and being transformable elastically.

Each of the bending portions 142 of the external ring 141 is a portion restored to an initial state in a shape by the elasticity thereof after the bending portion is transformed.

The bending portions 142 have shapes bent to protrude from the external ring 141 to the internal side thereof, and may be provided to be disposed at predetermined intervals along the circumferential surface of the external ring 141 thereon.

The bending portions 142 are configured to divide an entire section of the external ring being along the circumferential direction of the external ring 141 into various sections of predetermined lengths, and each of the stopper members 144 is integrally fixed on the internal circumferential surface located between two neighboring bending portions 142 on the external ring 141.

In the exemplary embodiment shown in FIG. 5 and FIG. 6, the external ring 141 includes a total of four bending portions 142 disposed at predetermined intervals along a circumferential direction of the external ring thereon, and each of the stopper members 144 of rubber materials is mounted on the internal circumferential surface of the external ring between the two neighboring bending portions 142 and accordingly, a total of four stopper members 144 are disposed.

In the stopper assembly 140, the bending portions 142 of the external ring 141 may be contracted in a radial direction of the external ring while being bent such that a diameter of the external ring is reduced, and in the present contracted state, the external ring 141 is press-fitted into the housing 101 to be provided therein.

Furthermore, after the external ring 141 in the contracted state is fitted into the housing 101, the shape of the bending portions 142 transformed during the contraction is restored to an initial shape of the bending portion while the bending portion is spread by an elasticity thereof, so that the external ring 141 is expanded or extended. In the instant case, an elastic restoring force of the bending portions 142 operates in a direction increasing the diameter of the external ring 141.

Accordingly, while the external ring 141 is press-fitted into the housing 101, the external ring is brought into close contact with the internal surface of the housing 101 by the elastic restoring force of the bending portions 142, that is, by a force expanding or extending in the radial direction thereof, and accordingly, the external ring 141 may be prevented from being removed from the housing 101.

In the exemplary embodiment of the present invention, the external ring 141 includes fitting protrusions 143 mounted on an surface of an external side thereof and the housing 101, to which the external ring 141 in fitted, includes insertion holes 105 to which the fitting protrusions 143 are inserted.

The fitting protrusions 143 and the insertion holes 105 allow the combined state of the stopper assembly 140 with the housing 101 to be maintained such that the stopper assembly 140 is securely fixed on the internal surface of the housing 101, so that the stopper assembly 140 is prevented from deviating from the housing 101.

That is, when the stopper assembly 140 is combined with the housing, the external ring 141 is contracted in the radial direction thereof, and as shown in FIG. 7, is press-fitted into the housing 101, and then when the fitting protrusions 143 of the external ring 141 are inserted into the insertion holes 105 of the housing 101, the external ring 141 may be completely locked to the housing 101 so as not to be removed from the housing.

Furthermore, in the exemplary embodiment of the present invention, the external ring 141 may include a total of four bending portions 142, and in the instant case, as shown in FIGS. 5, 6, and 8, the bending portions 142 are provided to be diagonally positioned on the external ring 141.

Furthermore, when each of the stopper members 144 is disposed on the internal circumferential surface of the external ring 141 positioned between the two neighboring bending portions 142, a total of four stopper members 144 may be provided. In the instant case, each pair of the stopper members 144 mounted on the internal circumferential surface of the external ring 141 surfaces each other.

Furthermore, when upward and downward directions in FIG. 8 are forward and rearward directions of a vehicle relative to the vehicle in mounting of the mount 100 to the vehicle, preferably, each of two stopper members 144 is provided at a front side and a rear side, respectively, relative to the forward and rearward directions of the vehicle to face each other, and each of the remaining two stopper members 144 is provided at a left side and a right side, respectively, to face each other.

That is, two stopper members 144 face each other by being disposed forward and rearward thereof, and the remaining two stopper members 144 face each other by being disposed leftward and rightward.

Of course, the entirety of the stopper members 144 forming the stopper assembly 140 is circularly disposed on the internal circumferential surface of the external ring 141, and the circular stopper assembly 140 is circularly disposed around the first insulator 130 relative to the first insulator 130 while the circular stopper assembly is fixed on the internal surface of the housing 101 of the mount 100.

In a normal vehicle, although the power train such as an engine may move in forward and rearward directions or in leftward and rightward directions in an engine chamber, the power train does not move diagonally.

Accordingly, when the mount 100 according to an exemplary embodiment of the present invention is mounted to a vehicle, as mentioned above, the stopper members 144 are disposed forward/rearward and leftward/rightward while surrounding the first insulator 130, and the bending portions 142 are diagonally disposed.

Accordingly, when the power train moves forward/rearward or leftward/rightward, the bending portions 142 and the first insulator 130 do not contact with each other and only the stopper members 144 of rubber materials may contact with the external circumferential surface of the first insulator 130.

Meanwhile, as shown in FIG. 7, after the stopper assembly 140 is combined on the internal surface of the housing 101 formed integrally with the first insulator 130, the fluid system 104, which is completely assembled, is combined on an upper side of the housing 101.

Figure 9:
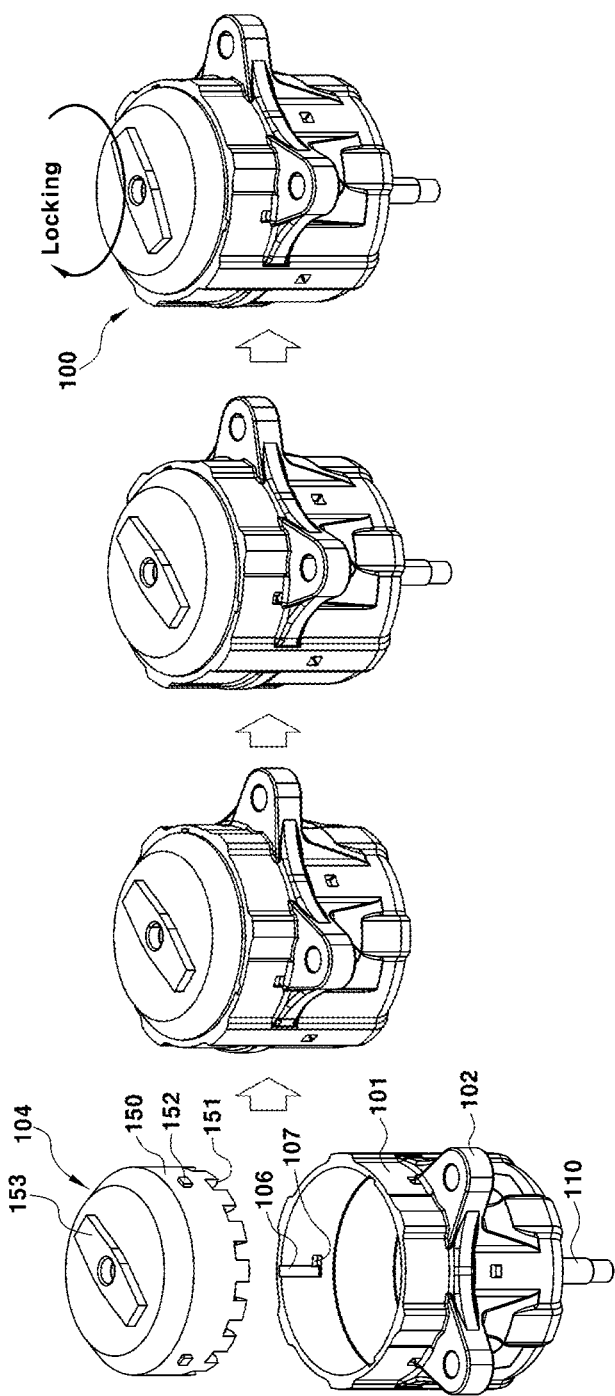
FIG. 9 is a perspective view exemplarily illustrating a process in which a fluid system is assembled with the housing of the mount according to the exemplary embodiment of the present invention.

FIG. 9 illustrates a process in which the fluid system 104 is assembled with the housing 101.

As shown in FIG. 9, to engage and fix the fluid system 104 to the housing 101, a plurality of locking protrusions 152 is mounted on an external circumferential surface of the cupped hook 150, and a plurality of guide grooves 106 long vertically is mounted on the internal surface of the housing 101 such that the locking protrusions 152 are inserted into the guide groove to be guided.

Furthermore, in the housing 101, locking holes 107, into which the locking protrusions 152 of the cupped hook 150 are inserted, is formed through a side portion of a lower end portion of the guide grooves 106.

In the exemplary embodiment of the present invention, the plurality of locking protrusions 152 may be mounted on the cupped hook 150 to be disposed at predetermined intervals along the circumferential direction of the cupped hook 150, and the plurality of guide grooves 106 and locking holes 107 may be mounted on the housing 101 to be disposed at predetermined intervals along a circumferential direction of the housing 101.

Finally, as shown in FIG. 9, when the fluid system 104 is inserted into the housing 101 during assembly of the fluid system, the locking protrusions 152 of the cupped hook 150 are inserted to the guide grooves 106 of the housing 101 and then the fluid system 104 is completely inserted thereinto downwardly in the housing 101 such that the locking protrusions 152 reach the lower end portion of the guide grooves 106.

Next, a handle 153 mounted on the cupped hook 150 by protruding therefrom is held and when the entirety of the fluid system 104 including the cupped hook 150 is rotated, the locking protrusions 152 of the cupped hook 150 are inserted into the locking holes 107 of the housing 101, the cupped hook is locked to the housing, and finally, the fluid system 104 is completely engaged with and fixed to the housing 101.

Figure 10:
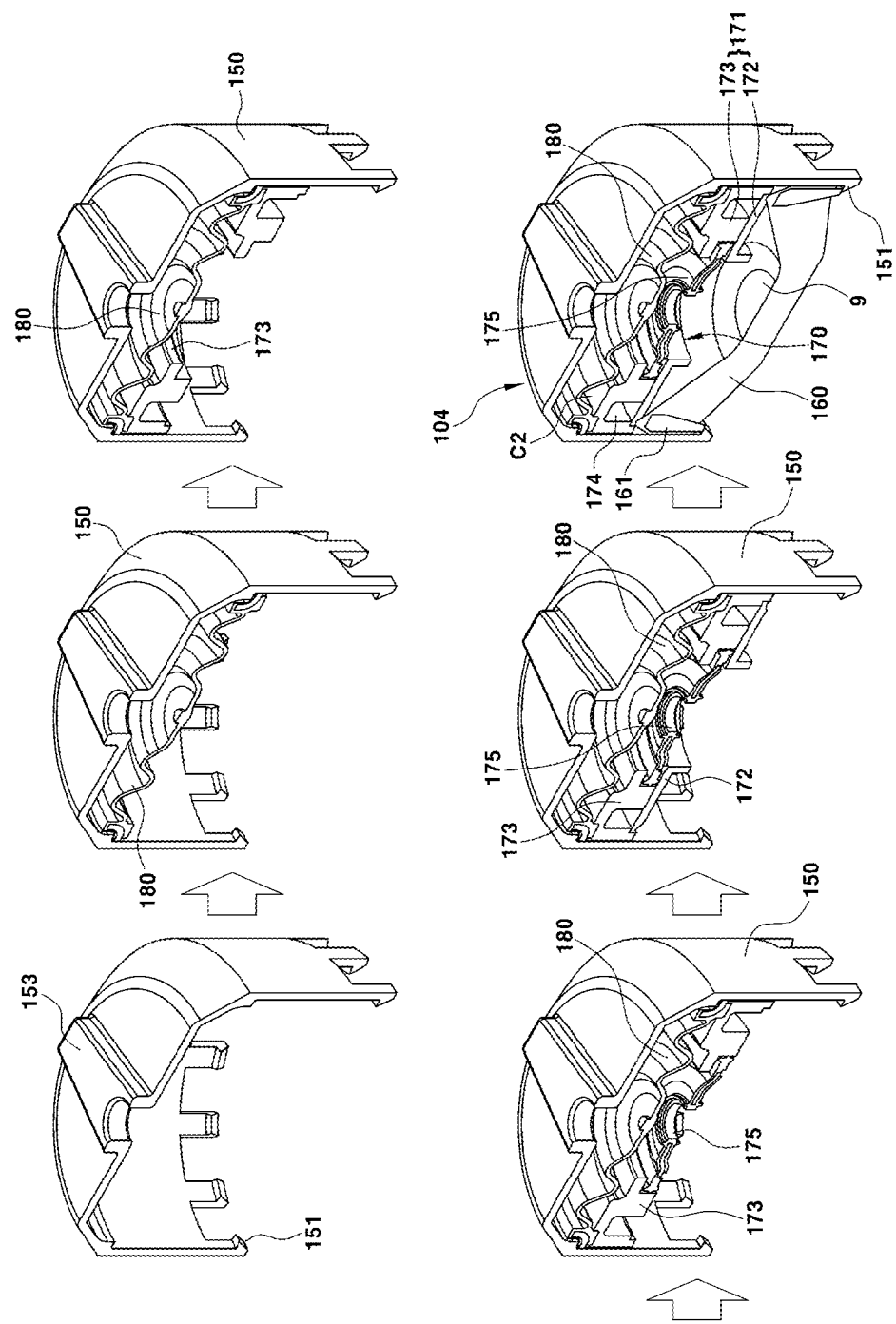
FIG. 10 is a perspective view exemplarily illustrating an assembling process of the fluid system of the mount according to the exemplary embodiment of the present invention.

Furthermore, FIG. 10 is a perspective view exemplarily illustrating an assembling process of the fluid system, and shows a process of the diaphragm 180, the orifice lower plate 173, the membrane 175, the orifice upper plate 172, and the second insulator 160 assembled sequentially in the cupped hook 150, which includes synthetic resin, forming the fluid system 104.

As shown in FIG. 10, after the diaphragm 180, the orifice lower plate 173, the membrane 175, and the orifice upper plate 172 are sequentially laminated in the cupped hook 150, the second insulator 160 is finally inserted into the cupped hook 150 to be laminated on the orifice upper plate 172.

As mentioned above, the core pipe 161, which may be made of a metal material such as an aluminum alloy, is integrally combined with the second insulator 160, and after the second insulator 160 is inserted into the cupped hook 150, the second insulator 160 is compressed such that the core pipe 161 of the second insulator 160 is hooked by the hooks 151 of the cupped hook 150.

Referring to the finally assembled drawing of FIG. 10, the hooks 151 of the cupped hook 150 are hooked to an end portion of the core pipe 161; the second insulator 160 is integrally fixed to the cupped hook 150; and finally, all the components of the fluid system 104 including the cupped hook 150 are integrally assembled with each other after the hooking.

After the hooking, fluid is injected into the fluid system 104 in a dry filling method.

FIG. 10 shows the exemplary embodiment of the hooks 151 of the cupped hook 150 hooked to the end portion of the core pipe 161, and the end portion of the core pipe 161 is the holding jaw hooked by the hooks 151.

Of course, as shown in FIG. 4, after the holding jaw 162 is independently mounted on the external surface of the core pipe 161, the hooks 151 of the cupped hook 150 may be hooked to the holding jaw 162, and a process of the exemplary embodiment of FIG. 4 being assembled is the same as the above process.

Figure 11:
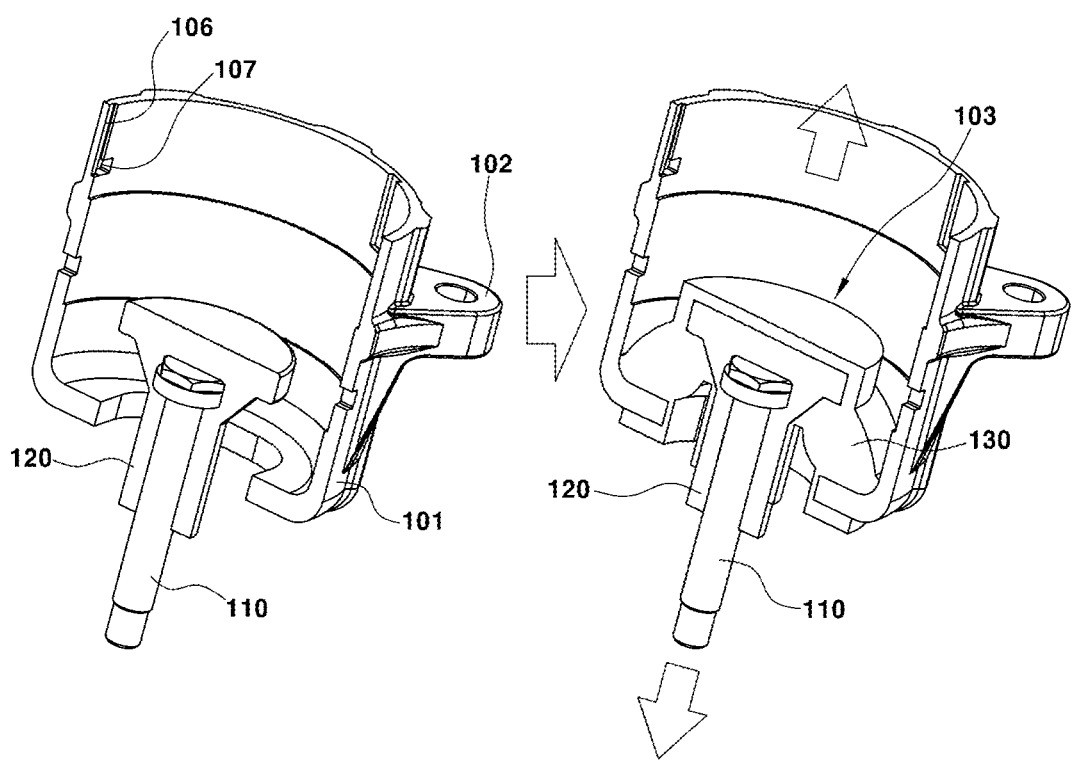
FIG. 11 is a perspective view exemplarily illustrating a process in which a rubber system of the mount according to the exemplary embodiment of the present invention is assembled.

FIG. 11 shows an assembling process of the rubber system 103, and after the housing 101 and the internal core 120 with which the center bolt 110 is combined are provided in a vulcanized mold to form the first insulator 130, the first insulator 130 is vulcanizingly formed in the mold, whereby the housing 101, the first insulator 130, and the internal core 120 are integrated with each other.

Figure 12:
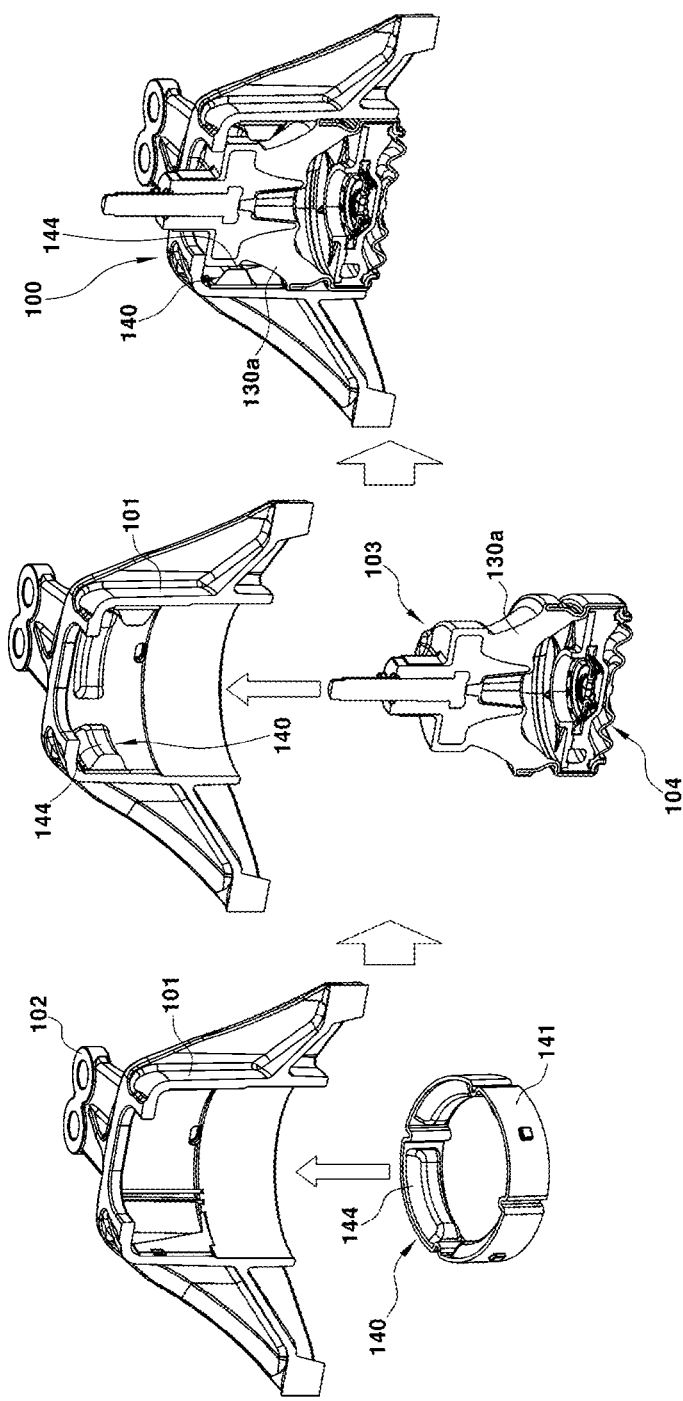
FIG. 12 is a perspective view exemplarily illustrating a mount according to various exemplary embodiments of the present invention.

Meanwhile, FIG. 12 is a perspective view exemplarily illustrating a mount according to various exemplary embodiments of the present invention, and shows a mount 100 in which a rubber system 103, which is a normal type and not an upside down type, is positioned on an upper side of the mount and a fluid system 104 is positioned on a lower side thereof.

In the same manner, a stopper assembly 140 of the same configuration is assembled on an internal surface of a housing 101, and furthermore, the stopper assembly 140 is circularly disposed along the vicinity of an insulator 130a in the housing 101.

Accordingly, the mount 100 according to an exemplary embodiment of the present invention features the stopper assembly 140, which is independently manufactured and provided.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A mount apparatus for supporting a power train in a vehicle, the mount comprising:

a housing and insulators;
a stopper assembly combined on an internal surface of the housing to be disposed in an annular shape along the vicinity of the outsides of the insulators combined with the housing,
wherein the stopper assembly includes:
an external ring of an annular shape combined on the internal surface of the housing; and
a plurality of stopper members fixed on an internal surface of the external ring to be positioned along the vicinity of the outsides of the insulators, each of the plurality of stopper members being spaced from each other to be in contact with an internal insulator of the insulators,
wherein the external ring includes a bending portion, and
wherein the bending portion is configured to be bent to be contractable when the external ring is press-fitted to the internal surface of the housing while having a bent shape and being elastically transformed to restore a contracted shape of the bending portion of the bending portion.

2. The mount apparatus of claim 1, wherein the bending portion has the bent shape to protrude from the external ring to an internal side thereof.

3. The mount apparatus of claim 1, wherein the external ring includes a plurality of bending portions provided thereon.

4. The mount apparatus of claim 3, wherein the plurality of bending portions is provided at predetermined intervals along a circumferential direction of the external ring.

5. The mount apparatus of claim 1,
wherein the bending portion has the bent shape to protrude from the external ring to an internal side thereof,
wherein a plurality of bending portions including the bending portion is mounted on the external ring to be disposed at predetermined intervals along a circumferential direction of the external ring, and
wherein the plurality of stopper members is provided such that a stopper member is fixed on the internal surface of the external ring between adjacent bending portions among the plurality of bending portions.

6. The mount apparatus of claim 5,
wherein the plurality of bending portions includes four bending portions mounted on the external ring to be disposed along the circumferential direction of the external ring, and
wherein each pair among the four bending portions are diagonally disposed on the external ring.

7. The mount apparatus of claim 6, wherein the plurality of stopper members includes:
two stopper members mounted between the adjacent bending portions among the plurality of bending portions and disposed on a front side and a rear side of the external ring, and
the remaining two stopper members disposed on a left side and a right side of the external ring, relative to forward and rearward directions of the vehicle.

8. The mount apparatus of claim 1,
wherein fitting protrusions are mounted on an external surface of the external ring by protruding therefrom, and insertion holes are provided on the housing, to which the external ring is fitted, to receive the fitting protrusions therein, and wherein the fitting protrusions are inserted into the insertion holes such that the external ring is fixed to the housing.

* * * * *